United States Patent
Neto et al.

(10) Patent No.: US 7,157,120 B2
(45) Date of Patent: Jan. 2, 2007

(54) METHOD FOR TREATING WOOD HAVING A HIGH EXTRACTIVE CONTENT

(75) Inventors: Nilo M. Neto, Sao Paulo (BR); Brian J. Knapp, Bedford, VA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/838,627

(22) Filed: May 4, 2004

(65) Prior Publication Data

US 2005/0249884 A1 Nov. 10, 2005

(51) Int. Cl.
 *B05D 7/06* (2006.01)
 *B05D 7/08* (2006.01)
 *B05D 3/06* (2006.01)

(52) U.S. Cl. .................. 427/408; 427/393; 427/397; 427/508; 427/553; 427/595

(58) Field of Classification Search .......... 427/402, 427/407.1, 408, 508, 541, 542, 553, 557, 427/558, 595, 372.2, 377, 378, 385.5, 389, 427/393, 397
See application file for complete search history.

(56) References Cited

U.S. PATENT DOCUMENTS

| | | | |
|---|---|---|---|
| 3,756,850 A | 9/1973 | Story | 117/147 |
| 3,756,975 A | 9/1973 | Story | 260/29.6 R |
| 3,808,037 A | 4/1974 | Story | 117/147 |
| 3,852,087 A | 12/1974 | Nordyke et al. | 106/288 B |
| 4,104,228 A | 8/1978 | Meyer et al. | 160/29.6 NR |
| 4,171,387 A * | 10/1979 | Fogle et al. | 427/514 |
| 4,218,516 A | 8/1980 | Meyer et al. | 428/537 |
| 5,041,487 A | 8/1991 | Kissel | 524/377 |
| 5,051,283 A * | 9/1991 | Beane et al. | 427/440 |
| 5,238,680 A | 8/1993 | Connolly | 424/195.1 |
| 5,312,863 A | 5/1994 | Van Rheenen et al. | 524/555 |
| 5,436,069 A | 7/1995 | Winterowd et al. | 428/318.8 |
| 5,460,644 A * | 10/1995 | Thomassen | 106/18.32 |
| 5,527,619 A | 6/1996 | Rokowski et al. | 428/452 |
| 5,529,811 A | 6/1996 | Sinko | 427/440 |
| 5,681,880 A | 10/1997 | Désor et al. | 524/320 |
| 5,733,666 A | 3/1998 | Sinko | 428/537.1 |
| 5,759,705 A | 6/1998 | Sinko | 428/537.1 |
| 5,922,777 A | 7/1999 | Van Rheenen et al. | 521/28 |
| 6,017,998 A * | 1/2000 | Duan et al. | 524/591 |
| 6,033,681 A | 3/2000 | Narayanan et al. | 424/405 |
| 6,113,989 A | 9/2000 | Sinko | 427/408 |
| 6,218,012 B1 | 4/2001 | Rota et al. | 428/402 |
| 6,245,141 B1 | 6/2001 | Walker, Jr. et al. | 106/499 |
| 6,489,037 B1 | 12/2002 | Winterowd et al. | 428/511 |
| 6,533,856 B1 | 3/2003 | Hodges et al. | 106/187.17 |
| 2002/0114940 A1 | 8/2002 | Clemens et al. | |
| 2002/0171170 A1 | 11/2002 | DeMasi et al. | |
| 2003/0004232 A1 | 1/2003 | Ruede | |
| 2003/0073778 A1 | 4/2003 | Zhang et al. | |
| 2003/0124330 A1 | 7/2003 | Belmares et al. | |
| 2003/0130362 A1 | 7/2003 | Van Rheenan | |
| 2004/0024135 A1 | 2/2004 | Verge et al. | |
| 2004/0034158 A1 | 2/2004 | Reuter et al. | |

FOREIGN PATENT DOCUMENTS

| | | |
|---|---|---|
| EP | 0192077 | 8/1986 |
| EP | 0482961 | 5/1995 |
| EP | 1291144 | 3/2003 |
| EP | 1 291 144 A2 * | 3/2005 |
| GB | 1481823 | 8/1977 |
| GB | 1530186 | 10/1978 |
| JP | 04185688 | 7/1992 |
| WO | WO 96/20794 | 7/1996 |
| WO | WO 98/29199 | 7/1998 |
| WO | WO 98/29489 | 7/1998 |
| WO | WO 98/45053 | 10/1998 |
| WO | WO 03/106574 | 12/2003 |

OTHER PUBLICATIONS

Bondthane™ UD-220 Technical Bulletin.

* cited by examiner

*Primary Examiner*—William Phillip Fletcher, III
(74) *Attorney, Agent, or Firm*—Diane R. Meyers; Donald R. Palladino

(57) ABSTRACT

A method for treating wood having a high extractive content is disclosed. The method generally comprises applying to the wood a coating comprising a water-based polyurethane dispersion and a crosslinker. The dispersion can be cured and one or more additional coatings can be applied. The method results in reduced migration of extractives to the surface of the wood, improved adhesion and/or reduced staining of the wood.

17 Claims, No Drawings

METHOD FOR TREATING WOOD HAVING A HIGH EXTRACTIVE CONTENT

FIELD OF THE INVENTION

The present invention relates to wood coatings, particularly a primer suitable for use with woods having a high extractive content.

BACKGROUND OF THE INVENTION

Various woods comprise relatively high levels of extractives that include, for example, oils, rosin and tannin, which can migrate to the surface of the wood. While this migration will often happen over time, it can also be accelerated upon application of heat. Accordingly, this migration can be particularly problematic when a UV curable coating is applied to the wood; the heat from the UV lamps can cause extractives to migrate to the surface and interfere or retard the UV cure of the coating. This migration can also lead to adhesion problems between the coating and the wood. These adhesion problems can be observed both at the time of coating and also subsequently, when "lifting" of the coating may be observed. In addition to the adhesion issues that this migration causes, it can also cause subsequent staining or discoloration of the coating.

Currently available primers for these types of woods, including two component solvent-based urethanes and compositions having tannin blocking components, are only moderately successful in impeding the migration of extractives to the surface of the wood. Accordingly, improved primers for high extractive content wood are desired. Waterborne coatings are particularly desirable for handling, environmental and other reasons.

SUMMARY OF THE INVENTION

The present invention is directed to a method for treating wood having a high extractive content comprising applying to the wood a coating comprising a water-based polyurethane dispersion and a crosslinker therefor. It has been surprisingly discovered that the water-based polyurethane dispersion used according to the present invention blocks or retards the migration of extractives, particularly in oily woods, that retard UV curing of subsequent coatings, interfere with adhesion and/or cause staining or discoloration.

DETAILED DESCRIPTION OF THE INVENTION

The present invention is directed to a method for treating wood having a high extractive content comprising applying to the wood a coating comprising a water-based polyurethane dispersion and a crosslinker therefor. As used herein, "high extractive content" refers to wood having one or more of oil, rosin and tannin that migrate to the surface of the wood. "Treating" and like terms refers to applying the present coatings to wood so as to block or retard the migration of extractives to the surface of the wood, increase the adhesion of a coating to the wood, and/or reduce if not eliminate staining and/or discoloration of the wood. Adhesion problems can occur both at and after the time of coating application.

The woods treated according to the present invention will have high contents of extractives such as oils, rosin, tannins and the like that come to the surface of the wood and interfere with UV curing of UV curable coatings, interfere with adhesion of coatings to the wood, and/or cause staining of the coatings. Examples of high extractive-content woods include oily woods and high rosin content woods. Oily woods are those having oils that migrate to the wood surface, including, for example, Brazilian walnut (also known as Ypê), Brazilian cherry, cabreuva (also known as santos mahogany), and Australian cypress. Woods having a high rosin content, that is, those having rosin that migrates to the wood surface, are also particularly suitable for treatment according to the present invention. Such wood includes pine. Cedar and redwood are also high-extractive content woods according to the present invention.

In one embodiment of the present invention, the polyurethane dispersion is a polyester polyurethane, and in another embodiment of the invention, the polyester polyurethane is an aliphatic polyester polyurethane. The dispersion can comprise, for example, between 20 and 70 percent solids and 30 to 80 percent solvent. While the solvent is typically primarily water, it is also possible to have some organic solvent present as well. The organic solvent will typically comprise less than half of the total solvent. Suitable organic solvents include, for example, glycol ethers such as ethylene glycol monobutyl ether. An aliphatic polyester polyurethane dispersion comprising about 35 percent solids and 13 percent organic solvents is commercially available from Bond Polymers International as BONDTHANE UD-220.

The polyurethane dispersions used according to the present invention further comprise suitable crosslinkers, including, for example, carbodiimides, isocyanates, aziridines, and melamines; polyfunctional aziridines are particularly suitable. The crosslinkers are typically used in relatively small quantity, such as less than about 5 weight percent of the total composition, or 3 weight percent or less of the total composition.

The polyurethane dispersions of the present invention can further comprise one or more additives known in the art, including fillers such as talcs, flatting silicas, colorants, dyes, pigments, wetting agents, thickeners, flow and rheology modifiers, and plasticizers.

The polyurethane dispersions are not latex, as that term is commonly understood in the art. Synthetic latexes are colloidal suspensions made by emulsion polymerization and having particle sizes typically ranging from 0.05 to 0.15 microns. In general, emulsions or latexes are synthesized directly in water using external surfactants to disperse hydrophobic resin particles in water. Waterborne dispersions are usually self-stabilized through ionic charge. In some cases, an external surfactant can be added. Particle sizes typically range from 100 to 10,000 angstroms.

The polyurethane dispersions can be applied to the wood by any means known in the art such as rolling, spraying, brushing, and the like. Use of a relatively soft roll coater is particularly suitable to achieve the desired film thickness. Typically, the polyurethane dispersion will be applied so as to result in a dry film thickness of between about 10 and 20 grams per meter$^2$ (g/m$^2$), although the invention is not so limited.

The polyurethane dispersion, once applied to the wood, is cured. Cure can occur at ambient temperature or at elevated temperatures, i.e. less than about 100° C. For example, a forced air dry in one or more stages can be used.

Following cure, one or more additional coatings can be applied to the treated wood. Such coatings include, for example, stain coats, sealers, topcoats, and the like. In one embodiment, a coating subsequently applied to the treated wood is a UV curable topcoat. Suitable examples of such UV curable topcoats include acrylate or polyurethane acrylate coatings such as R1467Z74 or R667Z74 available from PPG Industries, Inc. In another embodiment, the coating applied on top of the wood treated according to the present invention is curable at ambient or elevated temperatures. Examples of such coatings include moisture cure polyurethane, epoxy, polyester, acrylic or other thermoplastic or thermoset stains, lacquers, varnishes, paints or coatings suitable for finishing wood. Any combination of coatings applied to the treated wood are within the scope of the present invention.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

The following coatings were applied to Ypê Wood Parquet substrates as discussed below and as indicated in Table 1.
1. R 1001.00 Hydroprimer
2. R 1143Z49.00 UV Primer Sealer
3. R 1369Z74.00 Raycron HA Sealer
4. R 1486Z74.00 Raycron UV Sealer
5. R 1268Z74.00 UV SR Top Coat (10 g/m$^2$)
6. R 1268Z74.00 UV SR Top Coat (14 g/m$^2$)

The hydroprimer was prepared by mixing BONDTHANE UD-220 with deionized water and butyl cellosolve to a concentration of 28 percent solids; an aziridine crosslinker in an amount of 0.5 weight percent was added to some of the hydroprimer. Item 2 to Item 6 are commercially available from PPG Industries, Inc. All of the coatings were rolled coated over a wiped and cleaned parquet wood with no dirt or dust. Item 2 to Item 6 were applied sequentially to all of Samples 1–8. Sample 1 had no hydroprimer, Sample 2 had hydroprimer without crosslinker, and Samples 3 to 8 had hydroprimer with crosslinker with varying film thickness. Line speed for application was 9 m/min.

The hydroprimer was applied using a sponge roller coater. R 1143Z49.00 UV Primer Sealer layer was cured by exposure of about 300 mJ/cm$^2$ using 80 W/cm medium pressure mercury UV curing lamps (part no. 25–20008-E), available from Western Quartz Products, Inc., to a dry film thickness of about 17 g/m$^2$.

R 1369Z74.00 Raycron HA and R 1468Z74.00 UV Sealers were applied consecutively to a film thickness of 12 and 14 g/m$^2$, respectively, using a Dubois roll coater. The coatings were cured by exposure from 200 up to 550 mJ/cm$^2$ using the lamps described above. The coating surface was scuff sanded using a red 3M SCOTCHBRITE pad.

The final layers were applied with a first film thickness of 10 g/m$^2$ and a second film thickness of 14 g/m$^2$ of R 1268Z74.00 UV SR Top Coat using a Dubois roll coater, cured by exposure from 200 up to 450 mJ/cm$^2$ using the lamps described above.

Abrasion wear through resistance was tested using the following procedure: 4×4 inch pieces were cut from the wood sample prepared as described above. The pieces were mounted onto specimen holders of a Taber Industries abraser—Model 5150, which automatically counts cycles tested.

Abrasion resistance measurements were made using CS-O wheels covered with S-42 abrasive strips, both available from Taber Industries and Byk-Gardner. A 500 gram load was placed on each wheel. The S-42 strips were new at the start of testing of each sample and were replaced after every 500 cycles. The Taber abraser was energized and the wood surface monitored.

The test was complete when the abrasive strip had worn through the coating to initial exposure of bare wood. The number of cycles to wear through is reported in Table 1 as the average cycles to wear per mil of coating, and is the average of at least two test specimens. Coin adhesion was performed by scraping a coin along the sample. Oil migration was determined visually.

TABLE 1

| Sample | Hydroprimer | Crosslinker | Hydroprimer Film Thickness G/m$^2$ | Coin Adhesion Test | Oil Migration | Abrasion Cycles/Mil |
|---|---|---|---|---|---|---|
| 1 | — | — | — | Fail | Fail | 165 |
| 2 | Yes | No | 10 | Fail | Fail | 105 |
| 3 | Yes | Yes | 3 | Fail | Fail | 220 |
| 4 | Yes | Yes | 5 | Pass | Fail | 390 |
| 5 | Yes | Yes | 7 | Pass | Pass | 215 |
| 6 | Yes | Yes | 10 | Pass | Pass | 515 |
| 7 | Yes | Yes | 12 | Pass | Pass | 250 |
| 8 | Yes | Yes | 15 | Pass | Pass | 485 |

As can be seen from the results presented in Table 1, Sample 6 gave the best performance.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for treating wood having a high extractive content comprising applying to the wood a water-based polyurethane dispersion consisting of:
   (a) water;
   (b) a polyurethane;
   (c) a crosslinker for the polyurethane; and
   (d) optionally an organic solvent and/or at least one additive selected from the group consisting of a filler, a flatting silica, a colorant, a dye, a pigment, a wetting agent, a thickener, a flow modifier, a rheology modifier, and a plasticizer, wherein the water-based polyurethane dispersion blocks or retards the migration of extractives to the surface of the wood.

2. The method of claim 1, wherein the wood is an oily wood.

3. The method of claim 2, wherein the oily wood is selected from the group consisting of Brazilian walnut, Brazilian cherry, cabreuva, and Australian cypress.

4. The method of claim 1, wherein the wood has a high rosin content.

5. The method of claim 4, wherein the wood is pine.

6. The method of claim 1, wherein the wood is cedar.

7. The method of claim 1, wherein the wood is redwood.

8. The method of claim 1, wherein the polyurethane is a polyester polyurethane.

9. The method of claim 8, wherein the polyester polyurethane is an aliphatic polyester polyurethane.

10. The method of claim 1, wherein the crosslinker comprises aziridine.

11. The method of claim 1, wherein said coating is applied so that the coating, when cured, has a dry film thickness of between 10 and 20 $g/m^2$.

12. The method of claim 1 further comprising:
curing the water-based polyurethane dispersion; and
applying a second coating different from the water-based polyurethane dispersion to the wood.

13. The method of claim 12, wherein the second coating is UV curable.

14. The method of claim 13, wherein the second coating comprises acrylate.

15. The method of claim 12, wherein the second coating is curable at ambient or elevated temperatures.

16. The method of claim 12, wherein a stain is applied after the water-based polyurethane dispersion is cured and before the second coating is applied.

17. The method of claim 12, wherein the polyurethane dispersion is an aliphatic polyester polyurethane dispersion, and wherein the second coating is UV curable.

* * * * *